(12) United States Patent
Huddle et al.

(10) Patent No.: US 7,206,694 B2
(45) Date of Patent: Apr. 17, 2007

(54) TRANSFER ALIGNMENT OF NAVIGATION SYSTEMS

(75) Inventors: James R. Huddle, Chatsworth, CA (US); Victor K. Chueh, Thousand Oaks, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/892,577

(22) Filed: Jul. 16, 2004

(65) Prior Publication Data

US 2006/0015248 A1    Jan. 19, 2006

(51) Int. Cl.
*H04B 7/185* (2006.01)
*G01S 5/00* (2006.01)

(52) U.S. Cl. .................. 701/207; 701/220; 73/178 R

(58) Field of Classification Search ................ 701/207, 701/225, 220, 216; 342/357.14; 73/178 R
See application file for complete search history.

(56) References Cited

U.S. PATENT DOCUMENTS

| 3,056,290 | A | * | 10/1962 | Kishel | ........................ | 73/178 R |
| 5,640,325 | A | * | 6/1997 | Banbrook et al. | .......... | 701/220 |
| 6,449,559 | B2 | * | 9/2002 | Lin | ............................. | 701/216 |
| 2004/0030464 | A1 | * | 2/2004 | Buchler et al. | ................ | 701/4 |

\* cited by examiner

*Primary Examiner*—Dalena Tran
(74) *Attorney, Agent, or Firm*—Tarolli, Sundheim Covell & Tummino LLP

(57) ABSTRACT

Navigation systems provide accurate position, velocity and attitude information at one or more slave inertial measurement units (SIMU), mounted and spaced apart from a master inertial navigation system (MINS).

7 Claims, 5 Drawing Sheets

TRANSFER ALIGNMENT OF NAVIGATION SYSTEMS

FIELD OF THE INVENTION

This invention relates to navigation systems that provide accurate position, velocity and attitude information at one or more slave inertial measurement units (SIMU), mounted and spaced apart from a master inertial navigation system (MINS).

BACKGROUND OF THE INVENTION

In navigation systems that include a MINS and one or more SIMUs, MINS navigation parameters have been used as references to improve the accuracy of SIMU-computed navigation parameters. FIGS. 1, 1A and 1B show such systems. In the double subscript notation used herein to describe these systems, the left subscript denotes the location (MINS or SIMU) where a parameter is valid. The right subscript denotes a system (MINS or SIMU) based on whose information the parameter is computed.

Definitions applicable herein are:

MINS means Master Inertial Navigation System

SIMU means Slave Inertial Measurement Unit $\alpha$ (alpha) means wander angle $P_{MM}$ is the position of MINS computed based on MINS data $P_{SM}$ is the nominal position of SIMU computed based on MINS data. "Nominal" means: without considering high frequency relative motion between MINS and SIMU.

$P_{SB}$ is the best estimated position of SIMU, computed based on MINS and SIMU data $V_{MM}$ is the velocity of MINS computed based on MINS data $IV_{MM}$ is the integral of velocity of MINS computed based on MINS data $IV_{SM}$ is the integral of nominal velocity of SIMU computed based on MINS data $IV_{SS}$ is the integral of velocity of SIMU computed based on SIMU data $V_{SS}$ is the velocity of SIMU computed based on SIMU data $V_{SB}$ is the best estimated velocity of SIMU $W_{MM}$ is the body angular rate of the MINS computed based on MINS data expressed in the navigation coordinate frame $W_{SS}$ is the body angular rate of the SIMU computed based on SIMU data expressed in the navigation coordinate frame $IW_{MM}$ is the integral of body rate of MINS computed based on MINS data expressed in the navigation coordinate frame $IW_{SS}$ is the integral of body rate of SIMU computed based on SIMU data expressed in the navigation coordinate frame $T^N{}_{Bm}$ is the transformation matrix from MINS's body frame to navigation coordinate frame $T^{Bm}{}_V$ is the transformation matrix from vehicle frame to MINS's body coordinate frame $H_M$ is the vehicle heading computed by MINS $T^N{}_{Bs}$ is the transformation matrix from SIMU's body coordinate frame to navigation coordinate frame $T^{Bs}{}_V$ is the transformation matrix from vehicle frame to SIMU's body coordinate frame $H_S$ is the vehicle heading computed by SIMU Inertial Coordinate Frame—This is a system of three orthogonal axes that is fixed with respect to inertial space. The three axes have one axis directed along the mean rotational axis of the earth, a second axis defined in the mean equatorial plane of the earth and a third axis orthogonal to these two axes. The stars are fixed with respect to inertial space and so the Inertial Coordinate Frame is fixed with respect to the stars. One of the inertial frame axes in the mean equatorial plane of the earth can be selected to point relative to the stars. For example the direction of the star Aries is sometimes chosen.

Earth-Fixed Coordinate Frame—This is a system of three orthogonal axes that rotates with respect to the Inertial Coordinate Frame at the rate of rotation of the earth. The earth has a mean rotation about its polar axis that is also one of the axes of the Inertial Coordinate Frame. The polar axis of the Earth-Fixed Coordinate Frame is coincident with the polar axis of the Inertial Coordinate Frame. A second axis of the Earth-Fixed Coordinate Frame lies in the mean equatorial plane of the earth in the direction of the longitudinal meridian that passes through Greenwich, England. The third axis is orthogonal to these two axes and thereby lies in the mean equatorial plane of the earth.

Navigation Coordinate Frame—The navigation coordinate frame is a system of three orthogonal axes that is defined at the position of a navigation system. The Navigation Coordinate Frame has one axis coincident with what is called the "local vertical" that is defined as the direction of the gravity vector at the position of the navigation system. A second axis is defined in the "local level" plane that is orthogonal to the gravity vector. For example, this second axis can be chosen to point in the East direction. The third axis of the Navigation Coordinate Frame points in the North direction since it is orthogonal to the other two axes. The Navigation Coordinate Frame is translated in the East direction from the Earth-Fixed Coordinate Frame axis that resides in the mean equatorial plane of the earth in the Greenwich meridian by the longitude of the instantaneous position of the navigation system and translated in the North direction by the latitude of the instantaneous position of the navigation system.

Body Coordinate Frame—The Body Coordinate Frame is a system of three orthogonal axes that is defined with respect to the vehicle that carries the navigation system. For example, for an airplane, one axis is normally pointed in the direction of the nose of the airplane, a second axis is pointed in the direction of the right wing and a third axis is pointed in the direction orthogonal to these other two axes.

A navigation system may be installed on an aircraft such that axes of measurement of force by accelerometers, and angular change measured by gyros, are generally aligned with the body coordinate frame defined with respect to the vehicle. In these cases the orientation of the body coordinate frame with respect to the navigation coordinate frame can be defined by three angles of rotation. The first rotation can be about the local vertical of the navigation coordinate frame through an angle called heading of the vehicle. A second rotation can then be defined about the axis in the level plane displaced from the East direction. This second rotation angle is called pitch of the vehicle. A third rotation angle can be defined about the body frame axis pointed in the direction of the nose of the vehicle. This third rotation angle is called the roll of the vehicle.

Inertial Sensor Reference Coordinate Frame—The inertial sensor reference coordinate frame is an orthogonal set of axes defined by the sensing axes of the gyros and accelerometers. In most cases an accelerometer and gyro pair are mounted so that their sensing axes are nominally coincident and directed along an axis of the inertial sensor reference frame. Consequently the sensing axes for three such pairs will be directed along one of the axes of the inertial sensor reference frame. For current strapdown inertial systems, the installation of the inertial system in the vehicle is such that the inertial sensor reference frame is nominally coincident with the body coordinate frame of the vehicle. This assumption applies to the description of the transfer alignment mechanization below.

Alignment—Alignment is the process of determining the orientation of inertial instrument axes, gyros and accelerometers with respect to the Navigation Coordinate Frame. An example of this process comprises determining the orientation of a Body Coordinate Frame of a vehicle with respect to the East, North and vertical direction at the instantaneous position of a vehicle.

Transfer Alignment—Transfer alignment is a term used in the inertial navigation system field to define the process where the orientation of the inertial instrument axes of one inertial navigation system that has not been aligned, is aligned, using information from a second inertial navigation system that is aligned with respect to the Navigation Coordinate Frame. When the Transfer Alignment process is complete, the unaligned inertial navigation system knows the orientation of its gyros and accelerometers with respect to the Navigation Coordinate Frame and can perform the navigation function.

FIG. 1 shows a known MINS/SIMU system, in which a SIMU computes SIMU position ($P_{SS}$) and velocity ($V_{SS}$) information. A MINS provides reference position ($P_{SM}$) and velocity ($V_{SM}$) to a Kalman filter, after correction/compensation for the nominal lever arm linkage between the MINS location and the SIMU location. The Kalman filter determines the differences between the SIMU position and velocity information, and the MINS reference position and velocity information, and provides corrections to SIMU position and velocity to improve SIMU's navigation accuracy.

Because reference velocity ($V_{MM}$) can be noisy, FIG. 1A shows an alternative to the system of FIG. 1, using the integral of MINS velocity, $IV_{MM}$, instead of $V_{MM}$. FIG. 1B shows another alternative to the system of FIG. 1, where the Kalman filter observes the difference of heading, in addition to the difference of position and velocity, computed by SIMU and MINS, and provides corrections to the SIMU.

SUMMARY OF THE INVENTION

A transfer alignment mechanism/means comprises at least one MINS linked to at least one SIMU, where the MINS and SIMU are connected by a lever arm on the same vehicle, or on two different, linked vehicles such as the nose of an airplane and an antenna mounted elsewhere on the airplane. The MINS provides, to one or more SIMUs in such vehicles, navigation information that includes position ($P_{MM}$), wander azimuth angle ($\alpha$), velocity ($V_{MM}$), and body angular rate ($W_{MM}$).

A SIMU's nominal position, called $P_{SM}$ is obtained by combining the nominal lever arm with $P_{MM}$. The SIMU computes velocity ($V_{SS}$), direction cosines, meaning body coordinate frame-to-navigation coordinate frame transformation (direction cosines are needed to transfer accelerometer and gyro data from body frame to navigation frame), and body angular rate ($W_{SS}$), but does not compute SIMU position and wander angle. Instead, the SIMU uses position and wander angle from the MINS, as needed, in computing SIMU intermediate navigation parameters such as craft rate, earth rate, gravity, and earth radius of curvature. These intermediate parameters are needed for computing P, V, W, and $\alpha$, in a standard navigation algorithm.

The integral of nominal SIMU velocity, based on MINS information, from time $t_0$, to time $t_1$, is:

$$IV_{SM}=IV_{MM}+\text{(nominal lever arm at time, }t_1\text{)}-\text{(nominal lever arm at time, }t_0\text{)} \quad \text{Eq (1.1)}$$

The nominal position ($P_{SM}$) at the SIMU does not account for the high frequency relative motion of the SIMU. Equation 1.2 accounts for such motion:

$$P_{SB}=P_{SM}+(IV_{SS}-IV_{SM}) \quad \text{(Eq (1.2)}$$

A transfer alignment Kalman filter determines the difference between $IV_{SS}$ and $IV_{SM}$, and the difference between $IW_{SS}$ and $IW_{MM}$, expressed in the navigation coordinate frame, then provides updates to the SIMU. The components of integrals of velocity errors and body angular rate errors expressed in the navigation coordinate frame are modeled as six Kalman states, besides the standard navigation error states.

Closed loop updates are also applied to $IV_{SS}$ and $IW_{SS}$. The Kalman filter provides corrections to these parameters. The gyros and accelerometers of the SIMU track high frequency motions of the antenna. The Kalman filter updates maintain the long-term accuracy of velocity and attitude of the SIMU. Attitude is the orientation of SIMU described by the transformation matrix $T^N_{BS}$.

BRIEF DESCRIPTION OF THE DRAWINGS

These transfer alignment mechanisms/means can better be understood by reference to the drawings in which.

DETAILED DESCRIPTION OF THE DRAWINGS

Figure 1:
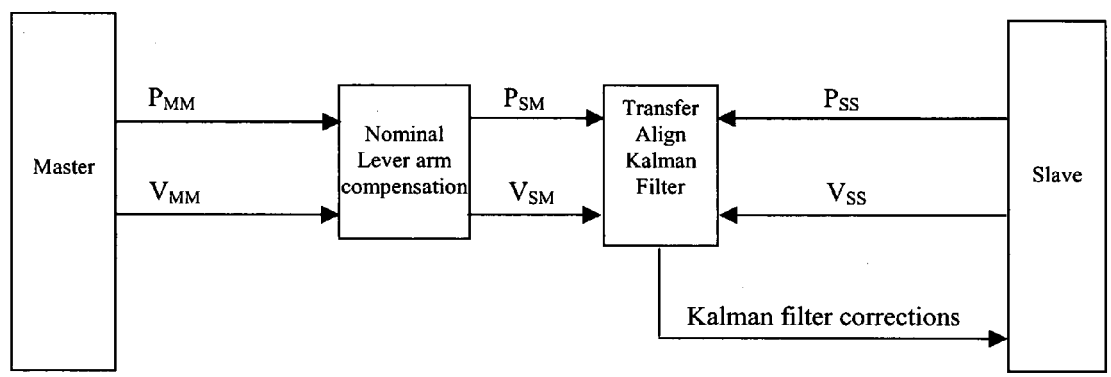
FIGS. 1, 1A and 1B show block function diagrams of known transfer alignment means.
Figure 1A:
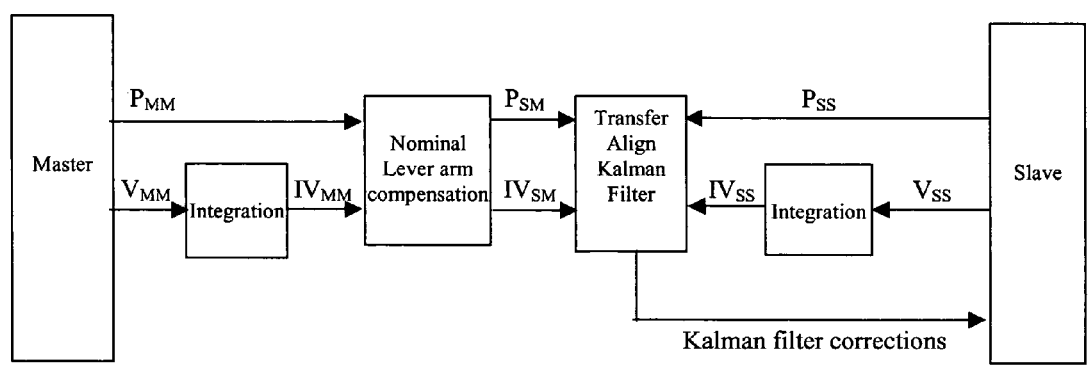
Figure 1B:
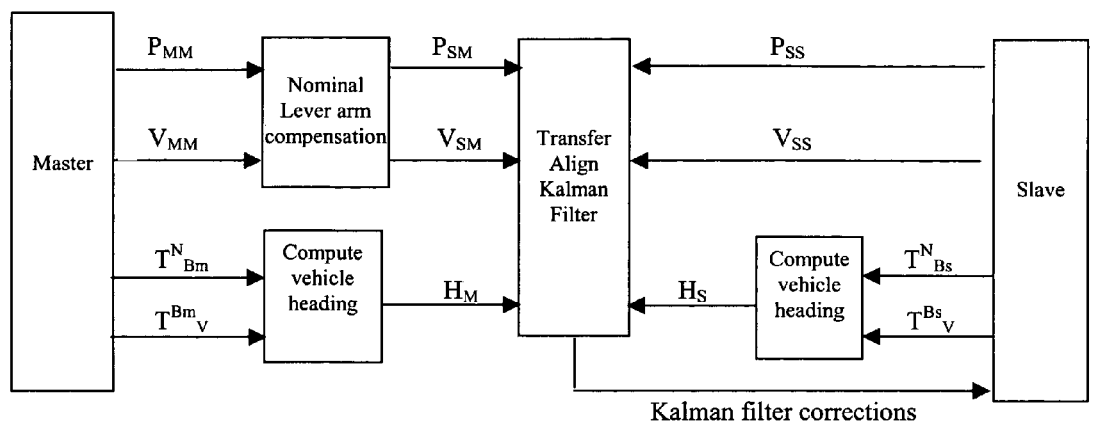
Figure 2:
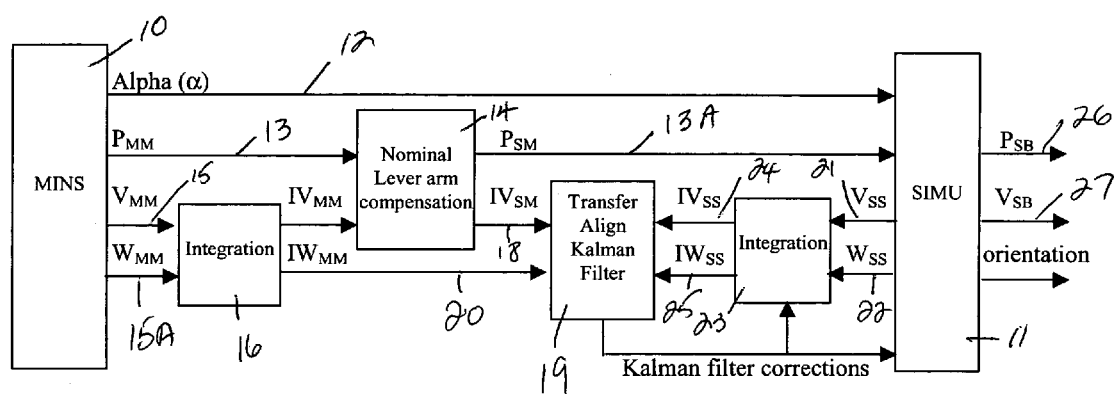
FIG. 2 shows a block function diagram of one embodiment of a new transfer alignment means.

In FIG. 2, a MINS 10 provides a SIMU 11 with MINS's wander angle 12, denoted $\alpha$, computed at the MINS. The MINS also computes and passes $P_{MM}$ 13 to the nominal lever arm compensation block 14. MINS passes $V_{MM}$ 15 and $W_{MM}$ 15A to a first integrator 16. This first integrator 16 computes and delivers $IV_{MM}$ 17 to the nominal lever arm compensation block 14, which adjusts $IV_{MM}$ 17 and $P_{MM}$ 13, then passes $IV_{SM}$ 18, the integral of nominal velocity of SIMU and $P_{SM}$ 13A to the Kalman filter 19. $IW_{MM}$ 20 also passes to the Kalman filter.

The SIMU passes $V_{SS}$ 21 and $W_{SS}$ 22 to another integrator 23. Integrator 23 passes $IV_{SS}$ 24 and $IW_{SS}$ 25 to Kalman filter 19. Kalman filter 19 compares $IV_{SM}$ 18 and $IW_{MM}$ 20 to $IV_{SS}$ 24 and $IW_{SS}$ 25, computes corrections, and passes these corrections to integrator 23 and to SIMU 11. The SIMU 11 outputs $P_{SB}$ 26, $V_{SB}$ 27 and an estimate of SIMU orientation 28 based in part on these corrections.

Figure 3:
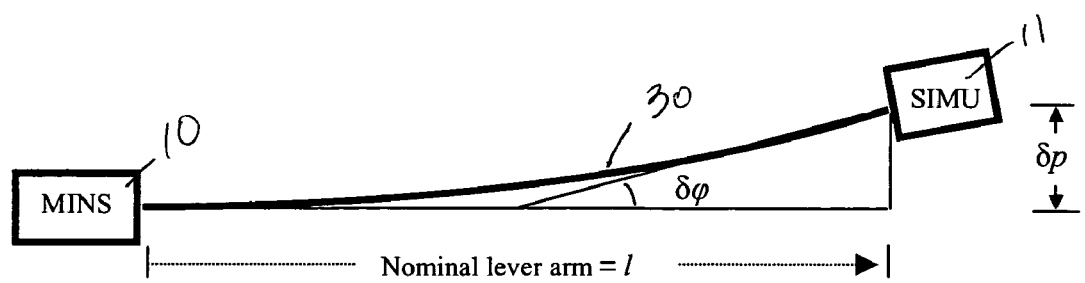
FIG. 3 shows, in schematic form, a lever arm connecting a MINS and a SIMU in an embodiment of a transfer alignment means.

FIG. 3 shows that, if the characteristics of the vehicle between MINS 10 and SIMU 11 can be modeled, the SIMU 11 can output better position, velocity and orientation based on the difference in orientation (the bending angle of the lever arm 30) computed by the MINS and the SIMU 11 relative to the navigation coordinate frame. For an assumed mounting vehicle, as in FIG. 3, the displacement ($\delta p$) of SIMU relative to MINS can be modeled as:

$$\delta p \approx (\delta\phi \times l)/2 \qquad \text{Eq (2.1)}$$

where $\delta\phi$ is the bending angle of the vehicle, and the bending angle is the attitude difference between the MINS and SIMU;

l is the nominal lever arm vector, not including the relative motion of SIMU, in the navigation coordinate frame; and "x" is the vector cross product of $\delta\phi$ and l.

Assuming no sagging motion of the lever arm, and a nominal bending angle of zero for the lever arm:

$$\delta\phi = IW_{SS} - IW_{MM} \qquad \text{Eq (2.2)}$$

$$d(\delta\phi)/dt = W_{SS} - W_{MM} \qquad \text{Eq (2.3)}$$

Under this approach, position and velocity at SIMU are:

$$P_{SB} = P_{SM} + \delta p \qquad \text{Eq (2.4)}$$

$$\begin{aligned}V_{SB} &= V_{MM} + dl/dt + d(\delta p)/dt \\ &= V_{MM} + dl/dt + 0.5 d(\delta\varphi \times l)/dt \\ &= V_{MM} + dl/dt + 0.5[\delta\varphi \times dl/dt + d(\delta\varphi)/dt \times l]\end{aligned} \qquad \text{Eq (2.5)}$$

The invention claimed is:

1. A method for determining position or velocity or orientation of a slave inertial measurement unit (SIMU) linked to a vehicle system and to a master inertial navigation system (MINS) comprising: obtaining velocity, and body angular rate information in the navigation coordinate frame from said MINS, integrating the MINS velocity and MINS body angular rate information to produce the integral of MINS velocity and MINS body angular rate, comparing the integral of MINS velocity and MINS body angular rate to the integrals of velocity and body angular rate of said SIMU, determining and applying corrections to SIMU position, velocity and orientation at said SIMU.

2. The method of claim 1 further comprising adjusting the MINS integrals of velocity and MINS position information for nominal lever arm compensation, where the lever arm links said MINS and said SIMU.

3. The method of claim 1 or claim 2 further comprising using MINS wander angle information and MINS position information to determine position, velocity or orientation of said SIMU.

4. A method for determining position or velocity or orientation of a slave inertial measurement unit (SIMU) linked to a vehicle system and to a master inertial navigation system (MINS) comprising: obtaining velocity, and body angular rate information in the navigation coordinate frame from said MINS, integrating the MINS velocity and MINS body angular rate information to produce the integral of MINS velocity and MINS body angular rate, comparing the integral of MINS velocity and MINS body angular rate to the integrals of velocity and body angular rate of said SIMU, determining and applying corrections to SIMU vehicle rate or earth rate or earth radius of curvature.

5. A transfer alignment system for a vehicle that includes at least one master inertial navigation system (MINS) linked to said vehicle and to at least one slave inertial measurement unit (SIMU) comprises means for obtaining the integral of MINS velocity and MINS body angular rate information and the navigation coordinate frame from said MINS, and means for comparing the integral of MINS velocity and MINS body angular rate to the integrals of velocity and body angular rate of said SIMU to determine corrections to apply to SIMU position, velocity and orientation at said SIMU.

6. The system of claim 5 further comprising means for adjusting the MINS integrals of velocity and MINS position information for nominal lever arm compensation, said system including a lever arm linking said MINS to said SIMU.

7. The system of claim 5 or claim 6 further comprising means for obtaining MINS wander angle information and MINS position information, and means for using said MINS wander angle information and said MINS position information to determine position, velocity or orientation of said SIMU.

* * * * *